United States Patent [19]
Zillgitt et al.

[11] Patent Number: 5,911,502
[45] Date of Patent: Jun. 15, 1999

[54] VEHICLE HEADLIGHT HAVING LOW AND HIGH BEAMS

[75] Inventors: Ulrich Zillgitt, Remshalden; Stefan Hammerstingl, Munich; Werner Schulze, Trochtelfingen; Thilo Wagner; Andreas Hammele, both of Pfullingen; Elefterios Konto, Ludwigsburg, all of Germany

[73] Assignee: Robert Bosch GmbH, Stuttgart, Germany

[21] Appl. No.: 09/025,026

[22] Filed: Feb. 17, 1998

[30] Foreign Application Priority Data

Mar. 14, 1997 [DE] Germany ............... 197 10 632

[51] Int. Cl.$^6$ ............................. B60Q 1/04
[52] U.S. Cl. ............... 362/508; 362/286; 362/288; 362/526
[58] Field of Search ............. 362/465, 467, 362/508, 523, 526, 285, 286, 288

[56] References Cited

U.S. PATENT DOCUMENTS 4,513,357 4/1985 Nieda et al. ............... 362/544
5,047,902 9/1991 Neumann et al. ............... 362/508
5,122,935 6/1992 Peterson ............... 362/508

FOREIGN PATENT DOCUMENTS 44 35 507 A1 4/1996 Germany.

Primary Examiner—Stephen Husar
Attorney, Agent, or Firm—MIchael J. Striker

[57] ABSTRACT

The present invention provides a a headlight operable as a running light of a vehicle and, in particular, as a headlight of the vehicle for selectively projecting a low and a high beam. The headlight includes a reflector having a light source disposed therein. A beam position adjusting device operates to move the light source between its low beam position and its high beam position. The beam position adjusting device includes an electric powered drive motor and a displaceable interconnecting element interconnecting the beam position adjusting device and the light source. The device also includes a motion translation element for translating the drive output of the drive motor to displacement of the displaceable interconnecting element, the beam position adjusting device being operable to dispose the light source in its high beam position. A return movement device automatically biases the light source to move to its low beam disposition when the drive motor is not powered.

20 Claims, 9 Drawing Sheets

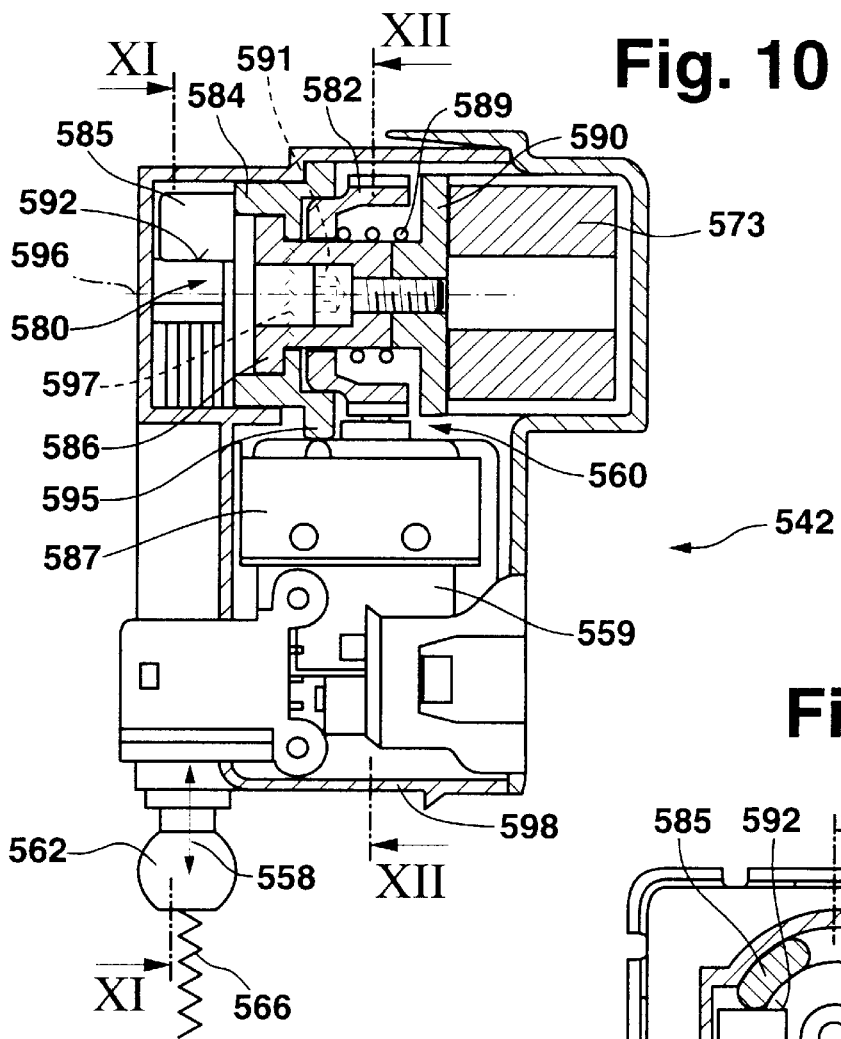
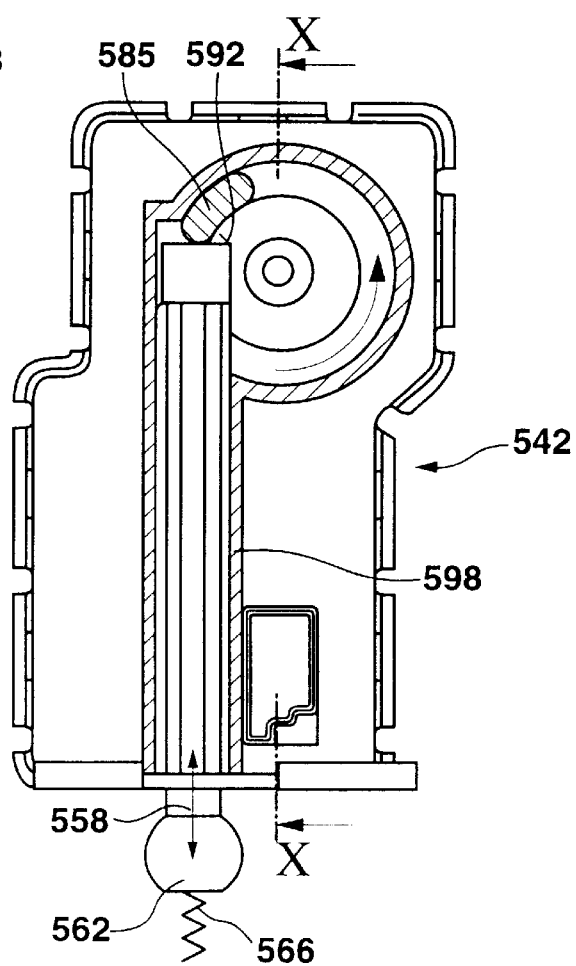

VEHICLE HEADLIGHT HAVING LOW AND HIGH BEAMS

BACKGROUND OF THE INVENTION

The present invention relates to a vehicle headlight having low and high beams.

German patent document DE 44 35 507 A1 discloses a headlight having a reflector in which is disposed a light source which is movable relative to the reflector between a low beam position and a high beam position. A beam position adjusting device is operable to move the light source between its low and high beam positions and includes an electric drive motor having a gear for driving movement of an engageable adjustment element which is itself coupled to a lamp support supporting the light source. The lamp support is moved into respective two engagement positions against a stop which corresponding to the two respective positions at which the light source is supported for its low and high beams. Regulatory safety guidelines have required that, in the event of a disturbance of the beam position adjusting device such as, for example, a shut down of the electric drive motor, a blocking of the gear, or an interruption of the electrical connections, the light source in such an event is not disposed in its position for high beams or some other position different than its low beam position or else the headlight may undesirably blind the drivers of oncoming traffic. In view of more assuredly satisfying such requirements, it is believed that improvements to the known beam position adjusting device can be made.

SUMMARY OF THE INVENTION

The present invention provides, in one aspect thereof, a headlight which advantageously assures, by operation of its return movement element, that the light source will be disposed in its low beam position in the event of a shut down or an operational interruption of the beam position adjusting device.

In one configuration of the one aspect of the present invention, the advantage is provided that, in a shut down event or an operational interruption of the beam position adjusting device of the type in which a presently electrically powered element is rendered into a non-powered condition, the return of the light source into its low beam position via operation of the return movement element is still assured.

In another configuration of the one aspect of the present invention, the advantage is provided that the electric drive motor of the beam position adjusting device is maintained in a powered condition in which it is blocked from moving the headlight into its high beam position.

In a further configuration of the one aspect of the present invention, the advantage is provided that the electric drive motor is disposable in its high beam position blocked status with only relatively little demand on the electric drive motor.

In still another configuration of the one aspect of the present invention, the advantage is provided that the movement of the beam position adjusting device into its low beam position can occur via operation of the return movement element. This is made possible due to the fact that the electrically powered electric drive motor is configured as an electro magnetic coupling which permits decoupling of the beam position adjusting device from the gear.

In accordance with the present invention, there is provided a headlight for a vehicle, the headlight having the capability of projecting a low beam and a high beam. The headlight includes a light source for emitting light, and a reflector for reflecting light emitted by the light source. The headlight also includes a beam position adjusting device for selectively adjusting the position of the light source relative to the reflector between a low beam position in which the headlight projects a low beam and a high beam position in which the headlight projects a high beam.

The beam position adjusting device includes an electric powered drive motor, a displaceable interconnecting element interconnecting the beam position adjusting device and the light source, and a motion translation element. The displaceable interconnecting element is movable between a low beam disposition in which it disposes the light source in its respective disposition relative to the reflector at which a low beam is projected thereby and a high beam disposition in which it disposes the light source in its respective disposition relative to the reflector at which a high beam is projected.

The motion translation element is operable to translate the drive output of the drive motor to displacement of the displaceable interconnecting element, the beam position adjusting device being operable to dispose the light source in its high beam position. The headlight also includes a return movement device for moving the light source from its high beam disposition to its low beam disposition.

According to other aspects of the present invention, the motion translation element includes an electrically activatable electromagnetic coupling operable to displace the displaceable interconnecting element in response to the supply of power to thereby move the light source from its low beam disposition to its high beam disposition.

In an additional aspect of the present invention, the motion translation element includes a gear assembly and the electromagnetic coupling operatively interconnects the gear assembly and the displaceable interconnecting element. The motion translation element may also include an electrically activatable electromagnetic coupling operable in a powered condition to dispose the light source in its high beam disposition. In one aspect of this variation, the electromagnetic coupling is connected to the displaceable interconnecting element and is operable to displace the displaceable interconnecting element to its high beam disposition and to maintain it in the high beam disposition during the powered condition of the electromagnetic coupling.

In a variation of the headlight of the present invention, the electromagnetic coupling is operable to block the motion translation element from translating the drive output of the drive motor to the displaceable interconnecting element. In another variation, the electromagnetic coupling is a solenoid operable in a powered condition to dispose the light source in its high beam disposition.

The motion translation element may also include, in a different variation, a worm gear connected to the displaceable interconnecting element such that rotational movement of the worm gear by the drive motor is translated into displacing movement of the displaceable interconnecting element and the solenoid includes a blocking member operable to engage the worm gear to prevent a return movement of the worm gear whereby the light source is maintained in its high beam disposition.

According to a further additional aspect of the present invention, the beam position adjusting device includes a slide coupling and an electrically activatable electromagnet, the return movement device is operable, in a non-powered condition of the electromagnet, to exert, via the displaceable interconnecting element, a sufficient turning moment on the slide coupling to move the light source from its high beam disposition to its low beam disposition and the electromagnet being operable, in a powered condition, to exert a turning moment via the slide coupling to overcome the turning moment exerted by the return movement device to a degree sufficient to displace the displaceable interconnecting element and the light source to their respective high beam dispositions.

BRIEF DESCRIPTION OF THE DRAWINGS

FIG. 10 is a vertical sectional view taken along lines X—X of FIG. 11 of the beam position adjusting device of a further additional embodiment of the headlight of the present invention;

FIG. 11 is a vertical sectional view taken along lines XI—XI of FIG. 10 of the beam position adjusting device of the further additional embodiment of the headlight of the present invention;

Figure 13:
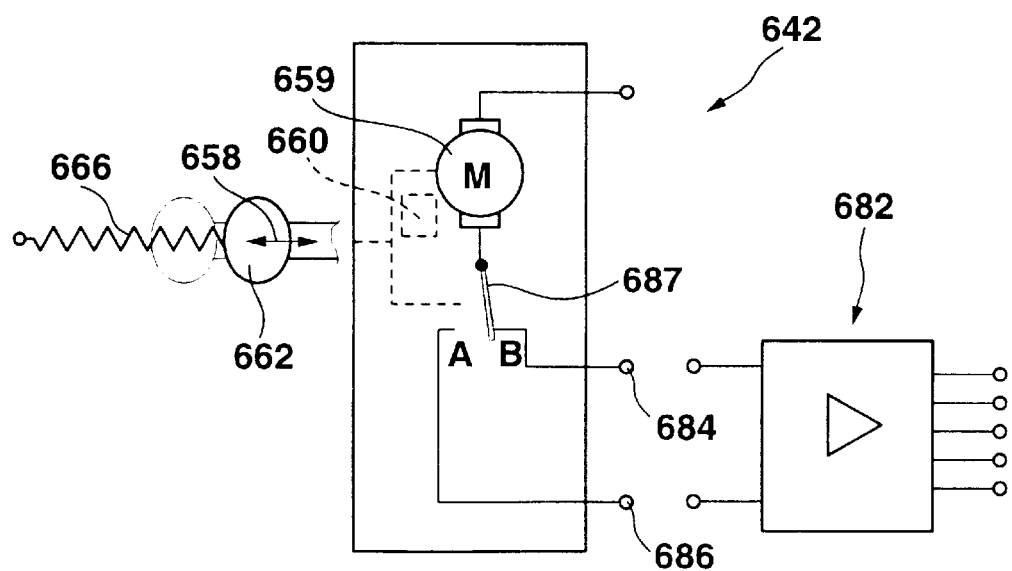
Figure 14:
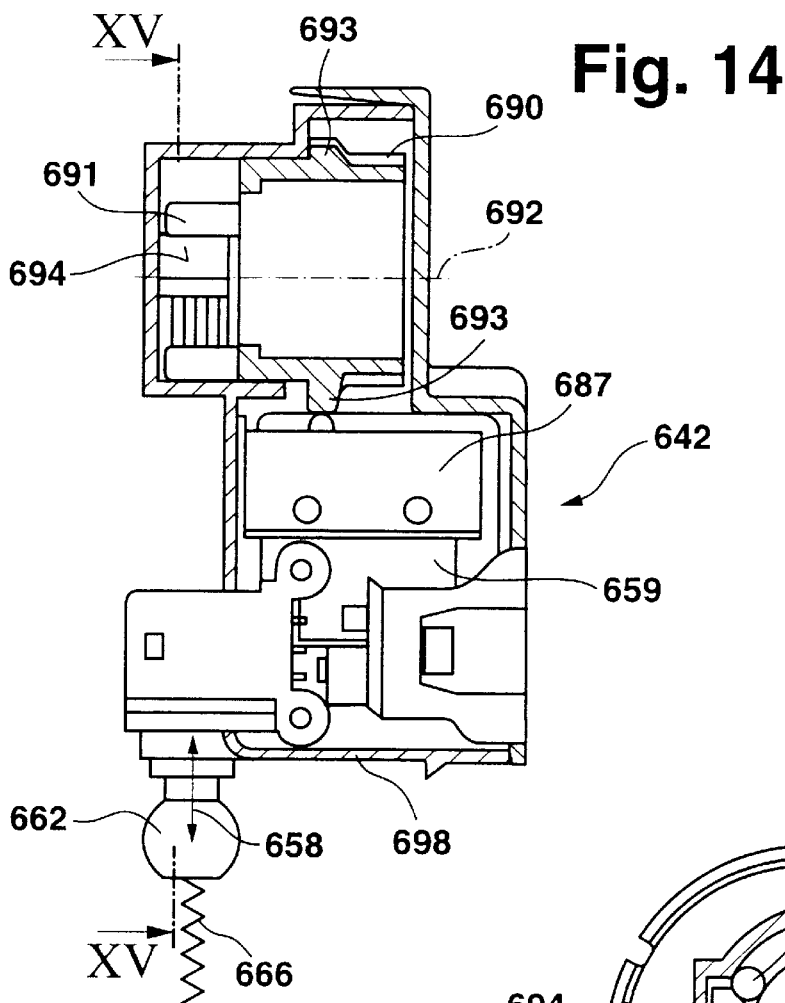
Figure 15:
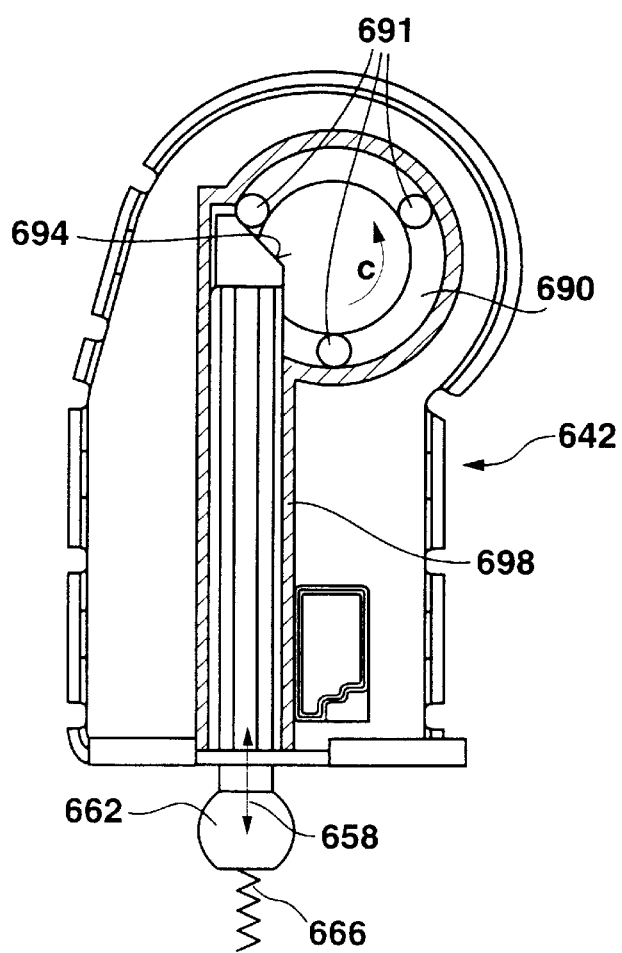
Figure 16:
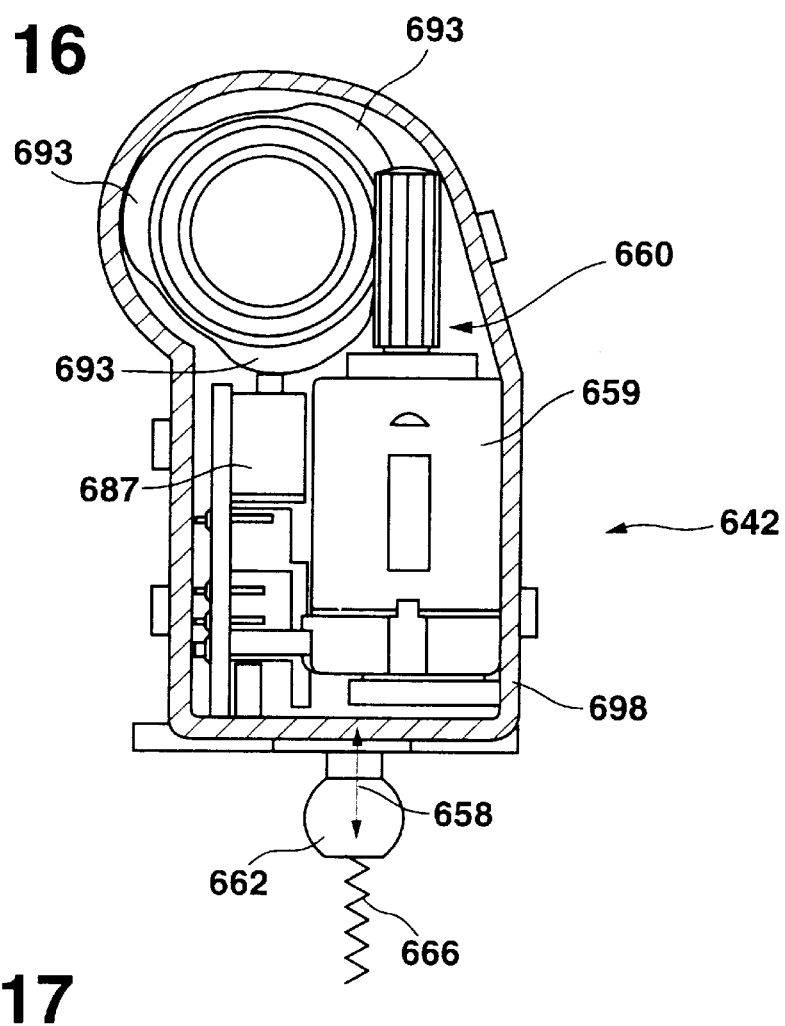
Figure 17:
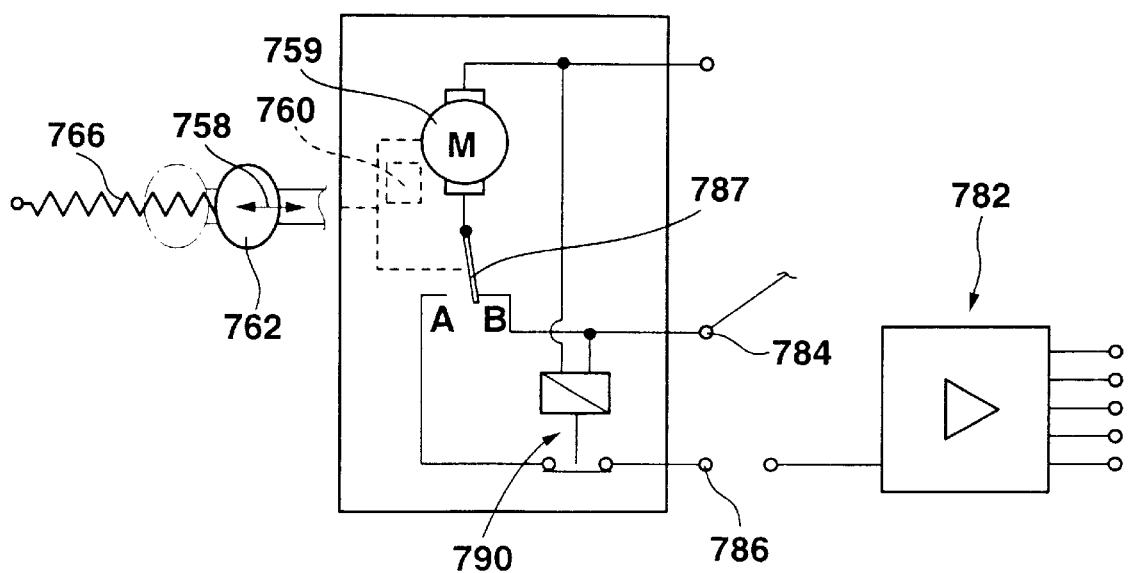

Figure light source 12 is a vertical sectional view taken along lines XII—XII of FIG. 10 of the beam position adjusting device of the further additional embodiment of the headlight of the present invention;

FIG. 13 is a simplified functional schematic view of the beam position adjusting device of a second further additional embodiment of the headlight of the present invention;

FIG. 14 is a vertical sectional view of the beam position adjusting device of the second further additional embodiment of the headlight of the present invention;

FIG. 15 is a vertical sectional view taken along lines XV—XV of FIG. 14 of the beam position adjusting device of the second further additional embodiment of the headlight of the present invention;

FIG. 16 is a vertical sectional view of the beam position adjusting device of the second further additional embodiment of the headlight of the present invention; and FIG. 17 is a simplified schematic view of the beam position adjusting device of a third further additional embodiment of the headlight of the present invention.

DETAILED DESCRIPTION OF THE PREFERRED EMBODIMENTS

Figure 1:
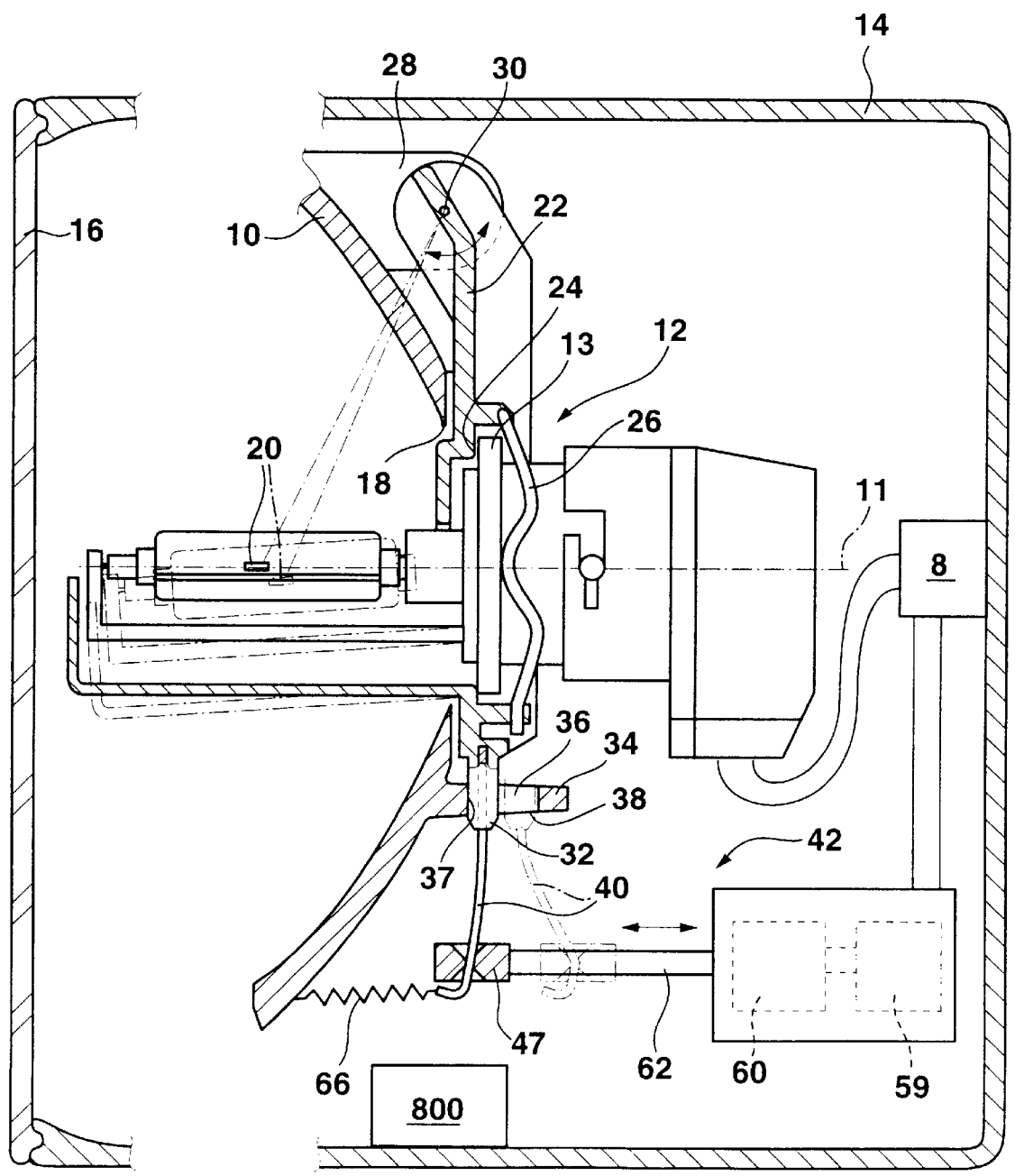
FIG. 1 is a vertical sectional view of one embodiment of the headlight of the present invention and showing a beam position adjusting device for adjusting movement of the headlight between its low beam position and high beam position.

As seen in FIG. 1, one embodiment of the headlight of the present invention is operable as a running light of a vehicle and, in particular, as a headlight of the vehicle for selectively projecting a low and a high beam. The headlight includes a reflector 10 having a light source 12 disposed therein. The reflector 10 is adjustably mounted on a support or carrier in the form, for example, of a housing 14. The housing 14 includes a light exit aperture which is covered by a light passing plate 16. The 10 includes an aperture 18 at its center portion through which the light source 12 extends. The light source 12 can be in the form of a glow lamp or, preferably, in the form of a gas discharge lamp and includes a light body portion 20 which is configured as a bulb or an arc lamp. In the event that the light source 12 is configured as a gas discharge lamp, an electrical starter 8 is provided which is required for starting and stably operating the gas discharge lamp. The light source 12 is disposed in a lamp support 22 which includes a receipt portion 24 for receiving thereon a base 13 of the light source 12 that extends adjacent the opening 18 of the reflector 10. The light source 12 is supported in a conventional manner such as, for example, on a resilient attachment element 26 of the lamp support 22.

The lamp support 22 is movable relative to the reflector 10 about a horizontal axis 30 which is perpendicular to an optical axis 11 of the reflector 10. A pair of pivot support arms 28 are mounted on the backside of the reflector 10 outward of its opening 18 at a horizontal spacing from one another (only one of the arms 28 is seen in FIG. 1). The arms 28 can be integrally formed with the reflector 10 or can be otherwise attached thereto and the lamp support 22 is pivotally mounted on the arms 28 for pivoting about the axis 30. The lamp support 22 includes a projection 32 on the portion of the support distal from the the portion thereof pivotally mounted to the arms 28. A travel slot portion 34 extends rearwardly from the reflector 10 under its opening 18 and integrally formed therewith or otherwise attached to the reflector 10. The travel slot portion 34 includes a travel slot 36 in which the projection 32 of the lamp support 22 is movably received. An elastically deformable interconnecting piece 40, which can be, for example, in the form of a leaf spring, is secured to the projection 32 in a slit therein. The free end of the interconnecting piece 40 is engageable by a drive arm 62 of a beam position adjusting device 42, which is described in more detail hereinbelow.

The beam position adjusting device 42 operates to pivot the lamp support 22 about its axis 30, whereby the light source 12 is movable between its low beam position and its high beam position. The low beam position of the light source 12 is shown by the solid lines in FIG. 1 and it is in this position that the projection 32 of the lamp support 22 is situated at its forwardmost travel position against the forward edge of the travel slot 36. The high beam position of the light source 12 is shown by the broken lines in FIG. 1 and it is in this position that the projection 32 of the lamp support 22 is situated at its rearwardmost travel position against the rear edge 38 of the travel slot 38. The interconnecting piece 40 ensures by its biasing action that the lamp support 22 is stably maintained against the respective front or rear edge of the travel slot 36 in the respective low beam position and high beam position position of the headlight. In its adjusting movement from the low beam position to the high beam position, the light source 12 is moved away from the reflector 10 and downward relative to the optical axis 11. In the low beam position, light emitted from the light body portion 20 of the light source 12 is reflected as a bundle or beam by the reflector 10 which, upon exiting the headlight, exhibits the prescribed bright-dark division. In the high beam position, light emitted from the light body portion 20 is reflected as a bundle or beam by the reflector 10 which, upon exiting the headlight, does not exhibit any bright-dark division and, in contrast to the low beam of the headlight, exhibits a relatively greater projection distance, whereby the more distant regions are sufficiently illuminated.

The beam position adjusting device 42 includes an electric drive motor 59 which is coupled via a gear assembly 60 to the drive arm 62. The electric drive motor 59 is operable to reversibly displace the drive arm 62 is the opposed directions indicated by the double arrows seen in FIG. 1 to thereby adjustably move the light source 12 between the low beam position and the high beam position. The beam position adjusting device 42 is preferably disposed in the headlight such as, for example, rearward of the reflector 10 as seen in FIG. 1. The arrangement of the beam position adjusting device 42 in the headlight can be selected such that the drive arm 62 is moved inwardly toward the beam position adjusting device 42 to effect movement of the light source 12 from the low beam position to the high beam position. Alternatively, the arrangement of the beam position adjusting device in the headlight can be selected such that the drive arm 62 is moved outwardly from the beam position adjusting device 42 to effect movement of the light source 12 from the low beam position to the high beam position. A return movement element 66 is provided for biasing the light source light source 12 into the low beam position at which position the projection 32 of the lamp support 22 is stopped against the forward edge 37 of the travel slot 36. The return movement element 66 can be in the form, for example, of a spring which, as seen in FIG. 1, can be a pull spring having one end secured to the reflector 10 and its other end secured to the free end of the interconnecting piece 40 or, alternatively, to a coupling end portion 47 which movably interconnects the interconnecting piece 40 and the drive arm 62 to one another. The return movement element 66 can also be configured as a push spring or a leaf spring. Severel variations of the beam position adjusting device 42 are described hereinbelow.

Figure 2:
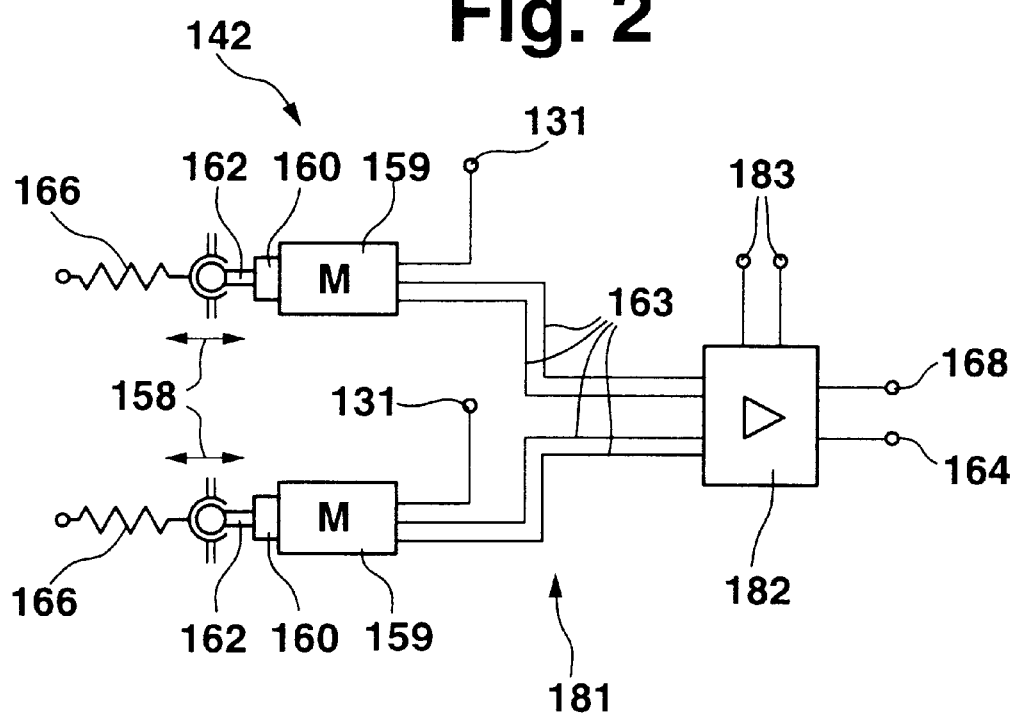
FIG. 2 is a simplified functional schematic view of the one variation of the beam position adjusting device of the headlight shown in FIG. 1.

FIG. 2 is a simplified functional schematic view of a beam position adjusting device 142 for adjusting the low beam position and high beam position of a pair of headlights. The beam position adjusting device 142 includes a respective electric drive motor 159 for each of the headlight pair, each electric drive motor being configured as a direct current motor and being coupled via a gear assembly 160 with a drive arm 162. The beam position adjusting device 142 can include a respective control unit for each of the headlight pair or can include a common control unit 182 which is electrically connected via connections 164 and 168 with the headlight switch of the vehicle. Power connections 183 connect the control unit 182 to an electric power source. The control unit 182 in this and the other herein described variations can be integrated into the starter device 8, if the light source 12 is configured as a gas discharge lamp or can be configured as a discrete element if the light source 12 is a glow lamp. The control unit 182 is connected via connections 163 with each electric drive motor 159 and each electric drive motor 159 is connected to ground via a connection 131. Each of the pair of headlights includes a return movement element 166 which biases the light source 12 of the headlight to the low beam position.

In the low beam position, the light source 12 is maintained by the return movement element 166 in its predetermined low beam position disposition and the electric drive motor 159 is not powered, whereby the connections 164 and 168 do not transmit any current. In the changeover of the headlight from the low beam position to the high beam position, the headlight switch is activated and the connection 168 carries current to the control unit 182, whereby the control unit powers the electric drive motor 159. In turn, the electric drive motor 159, via the gear assembly 160, draws the drive arm 162 inwardly against the bias of the return movement element 166 in the direction indicated by the right hand arrow of the double arrow 158 seen in FIG. 2. After a predetermined inward travel of the drive arm 162, the projection 32 of the 22 has been brought into a stop engagement with the rear edge 38 of the travel slot 36 and this is the position at which the light source 12 is in its predetermined disposition for the high beam position. The electric drive motor 159 is powered by the control unit 182 so long as the headlight is illuminated in its high beam position and the electric drive motor 159 is maintained in a blocked disposition in which no further adjusting movement can be performed. In the blocked disposition, the electric drive motor 159 can alternatively be intermittently powered so that the loading is less as compared to a constant power arrangement. A corresponding switch can alternatively be provided in the control unit 182 or the electric drive motor 159. During a changeover into the low beam position, the connection 164 of the control unit 182 carries current to the control unit and the control unit powers the electric drive motor 159 to drive the drive arm 162 outwardly in the direction indicated by the left hand arrow of the double arrow 158. This outward movement of the drive arm 162 moves the light source 12 into its predetermined disposition for the low beam position and, upon the arrival of the light source 12 into this disposition, both connections 164 and 168 are disposed in a non power condition.

The gear assembly 160 can be configured, for example, as a front wheel-type gear and configured to operate in a non-self limiting manner such that it is possible for the light source 12 to move from its predetermined disposition in the low beam position to its predetermined disposition in the high beam position by the biasing action of the return movement element 166 when the electric drive motor 159 is not being powered. In this event, the electric drive motor 159 operates as an electrically activated apparatus of the beam position adjusting device 142 by which, in its powered condition, it maintains the light source 12 in its disposition for the low beam position and, in its non-powered condition, it can be rotated as the return movement element 166 biases the light source 12 to move into its disposition for the low beam position. To the extent that operational disturbances occur to the beam position adjusting device 142, it is only necessary that the electric drive motor 159 be switched to a non-powered condition so that a movement of the light source 12 into its disposition for the low beam position can be effected by the return movement element 166. Alternatively, to effect a changeover from the high beam position to the low beam position, it is only necessary to switch the connection 168 of the control unit 182 to a non-current carrying condition so that the electric drive motor 159 is no longer powered and a subsequent movement of the light source 12 into its disposition for the low beam position can be effected by the return movement element 166. As another alternative, the gear assembly 160 can be configured as self limiting, it being recognized, however, that such a configuration does not effectuate the above noted security function by which the light source 12 is automatically moved by the return movement element 166 into its disposition for the low beam position. Instead, in this instance, a movement of the light source 12 into this disposition requires that the electric drive motor 159 be powered to drive the light source 12 into the disposition.

Figure 3:
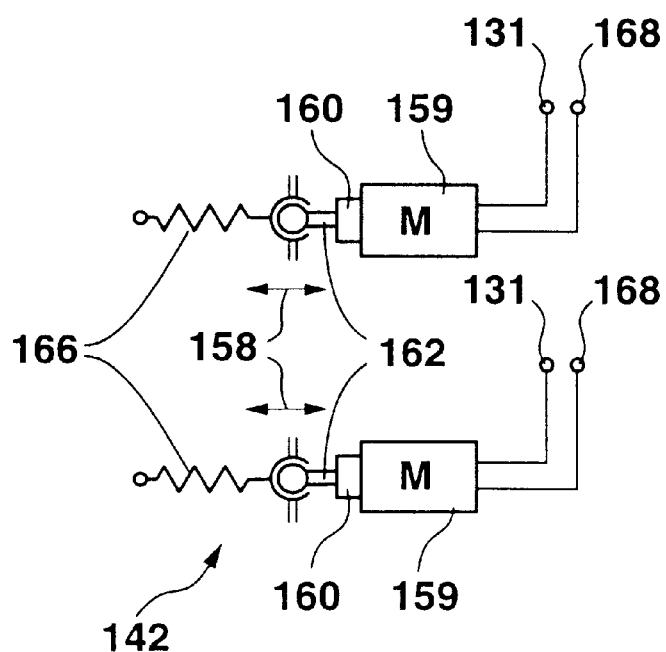
FIG. 3 is a simplified functional schematic view of another variation of the beam position adjusting device of the headlight shown in FIG. 1.

FIG. 3 is a simplified view of a variation of the beam position adjusting device 142 in which the control unit 182 is omitted. The electric drive motor 159 includes a ground connection 131 as well as an additional electrical connection 168. The switching of the headlight into the low beam position follows independent of the beam position adjusting device by means of the headlight switch of the vehicle, whereby the connection 168 is in a non-current carrying condition. To move the headlight into the high beam position, the connection 168 is supplied with current so that the electric drive motor 159 is powered and the drive arm 162 is driven in the direction of the right hand arrow of the double arrow 158, thereby moving the light source 12 into its disposition for the high beam position. So long as the high beam position remains selected via the headlight switch, the connection 168 supplies power to the electric drive motor 159 and the electric drive motor 159 thus is maintained in a blocked condition. If desired, the electric drive motor 159 can be powered in an intermittent manner to maintain it in its blocked condition. To effect a changeover to the low beam position, the connection 168 is placed in a non-current carrying condition via the headlight switch and this permits the return movement element 166 to move the light source 12 into its disposition for the low beam position, it being understood that the gear assembly 160 does not oppose such movement since it is configured as a non-self limiting gear.

In the event of an operational disturbance, the connection 168 will be in non-current carrying condition, thereby permitting movement of the light source 12 into its disposition for the low beam position. The electrical connections of the electric drive motor 159 be cabled into the headlight and can be led via a common cable or conduit harness with the electrical connections of the light source 12.

Figure 4:
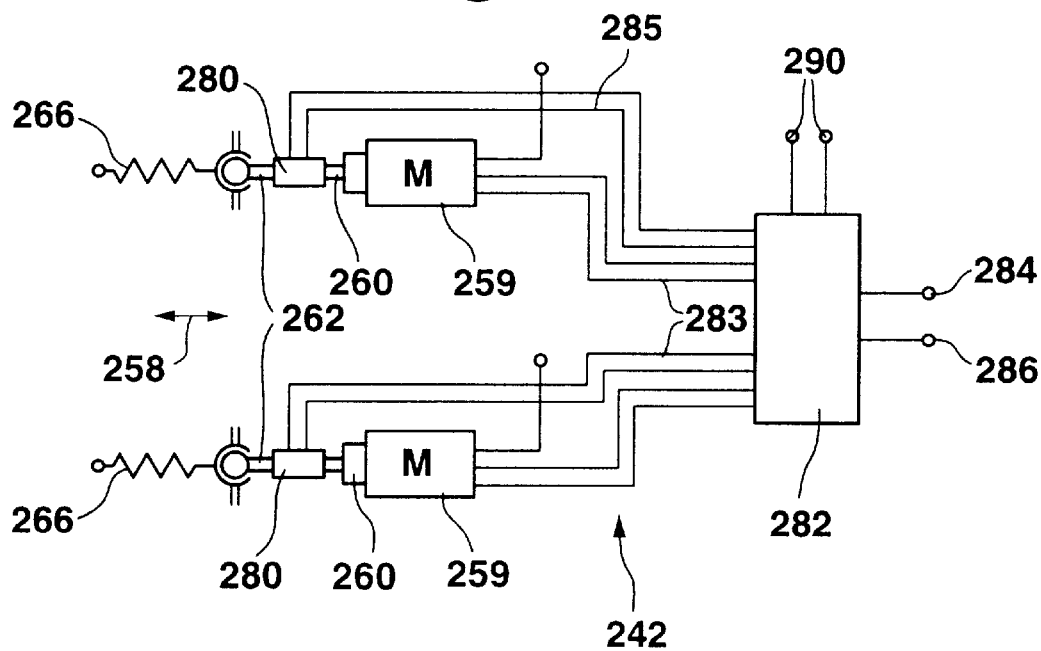
FIG. 4 is a simplified functional schematic view of the beam position adjusting device of another embodiment of the headlight of the present invention.

FIG. 4 is a simplified functional schematic view of the beam position adjusting device 242 of another embodiment of the headlight of the present invention. The beam position adjusting device 242 includes a control unit 282 having electrical power connections 290 as well as a connection 284 to the low beam position switch and a connection 286 to the high beam position switch. The control unit 282 is connected via a connection 283 to an electric drive motor 259 configured as a direct current motor. An electromagnet activatable coupling 280 is disposed between a gear assembly 260 and a drive arm 262. The coupling 280 can alternatively be disposed between the gear assembly 260 and the electric drive motor 259 of the beam position adjusting device 242.

In the low beam position, the connection 284 of the control unit 282 can, for example, be in a current carrying or a non-current carrying condition, whereby in the latter condition the electric drive motor 259 is not powered via the control unit 282. The coupling 280 can, in the low beam position, be either in a current carrying or a non-current carrying condition. In the event of a changeover to the high beam position, the connection 286 is disposed in a current carrying condition and, via the control unit 282, the coupling 280 as well as the electric drive motor 259 are powered, whereby the drive arm 262 is moved inwardly by the electric drive motor 259 in the direction indicated by the right hand arrow of the double arrow 258 seen in FIG. 4 and the light source 12 is disposed in its disposition for the high beam position. In connection with completion of the movement of the headlight into the high beam position, the control unit 282 is switched to a non-powered condition while the coupling 280 continues to be powered whereby the drive arm 262 and, consequently, the light source 12, are disposed in their respective dispositions for the high beam position. The gear assembly 260 is accordingly preferably configured as self limiting so that the return movement element 266 cannot effect any movement of the light source 12 into its disposition for the low beam position. In the event of a changeover to the low beam position, the connection 284 of the control unit 282 is supplied with current and the electric drive motor 259 is powered via the control unit 282 in such a manner that the electric drive motor 259 is rotated in the opposite direction and the drive arm 262 drives the light source 12 into its disposition for the low beam position. In this changeover, the coupling 280 can either continue to be powered or can be switched to a non-powered condition. In the low beam position, the electric drive motor 259 is then switched to a non-powered condition by the control unit 282 and the coupling 280 can be switched to a non-powered condition or be powered.

The coupling 280 thus operates as an electrically activatable element of the beam position adjusting device 242 whereby in the powered condition of the coupling, it maintains the light source 12 in its disposition for the high beam position. In the event of an interruption of the electrical connections of the control unit 282, the coupling is switched via the control unit 282 to a non-powered condition or alternately automatically switched to a non-powered condition, whereby the drive arm 262 is separated from the electric drive motor 259 and the light source 12 is moved by the return movement element 166 into its disposition for the low beam position and maintained thereby in that disposition.

In the event of other operational disturbances, the coupling 280 is switched via the control unit 282 to a non-powered condition so that it becomes possible for the return movement element 166 to move the light source 12 into its disposition for the low beam position and to maintain it threat.

Figure 5:
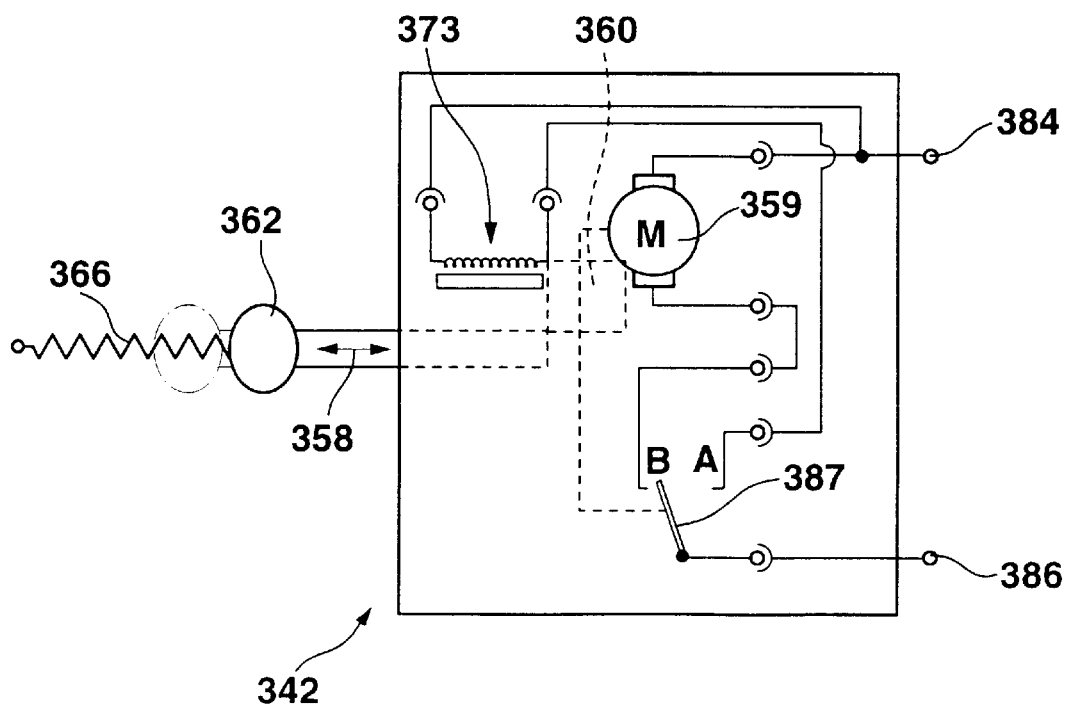
FIG. 5 is a simplified functional schematic view of the beam position adjusting device of a further embodiment of the headlight of the present invention.
Figure 6:
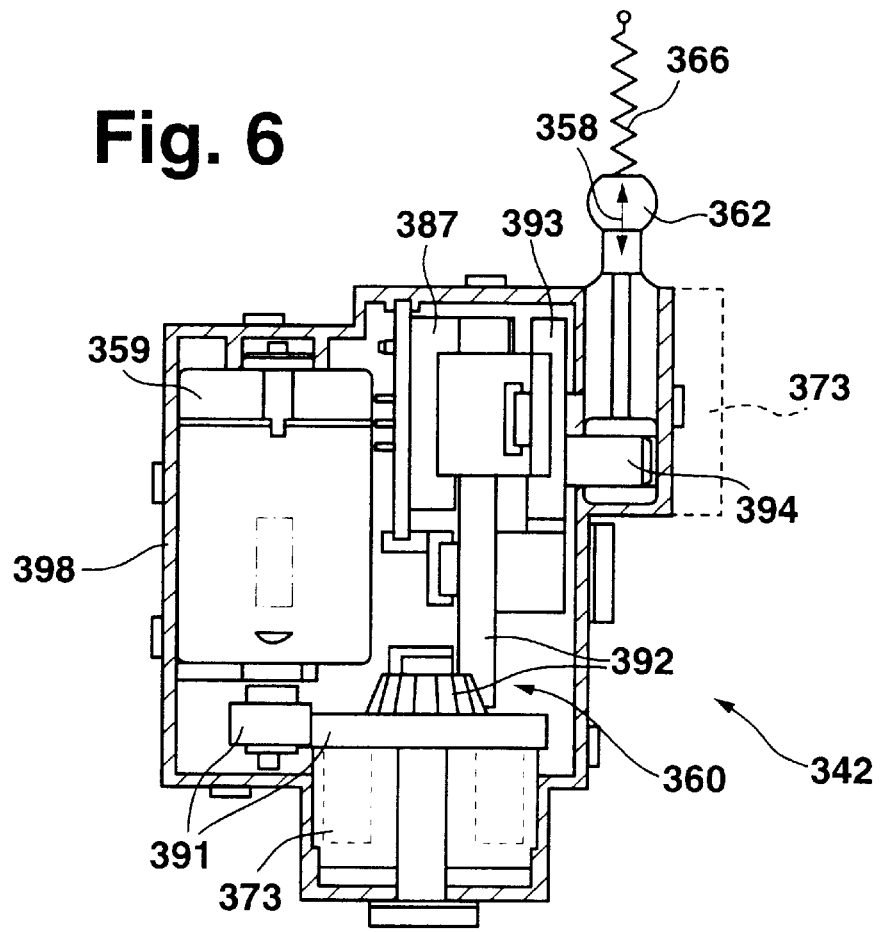
FIG. 6 is a vertical sectional view of the further embodiment of the headlight of the present invention shown in FIG. 5.

FIG. 5 is a simplified functional schematic view of the beam position adjusting device 342 of another embodiment of the headlight of the present invention and FIG. 6 is a vertical sectional view of the beam position adjusting device 342. The beam position adjusting device 342 does not include a control unit but does include an electrical connection 384 for connecting to ground and a connection 386 which is in a current carrying condition in the high beam position. The beam position adjusting device 342 includes a switch 387 which is switchable between a position B for the low beam position and a position A for the high beam position and which is correspondingly switched by a direct current electric drive motor 359. The beam position adjusting device 342 includes a housing 398 in which the electric drive motor 359, the switch 387, and the gear assembly 360 are disposed in and relative to which the drive arm 362 is reversibly movable in the opposed directions indicated by the double arrow 358. The gear assembly 360 includes a drive gear pair 391 on whose driven gear is mounted a gear of a conical gear pair 392 and a gear 393 which is driven by the other gear of the conical gear pair 392. A travel pin 394 is eccentrically mounted to the gear 393 and is movably received in the travel slot of the drive arm 362 for translating the rotational movement of the gear 393 into linear movement of the drive arm. The beam position adjusting device 342 also includes an electrically activatable device in the form of an electromagnet 373 whose function is described in more detail below.

Figure 7:
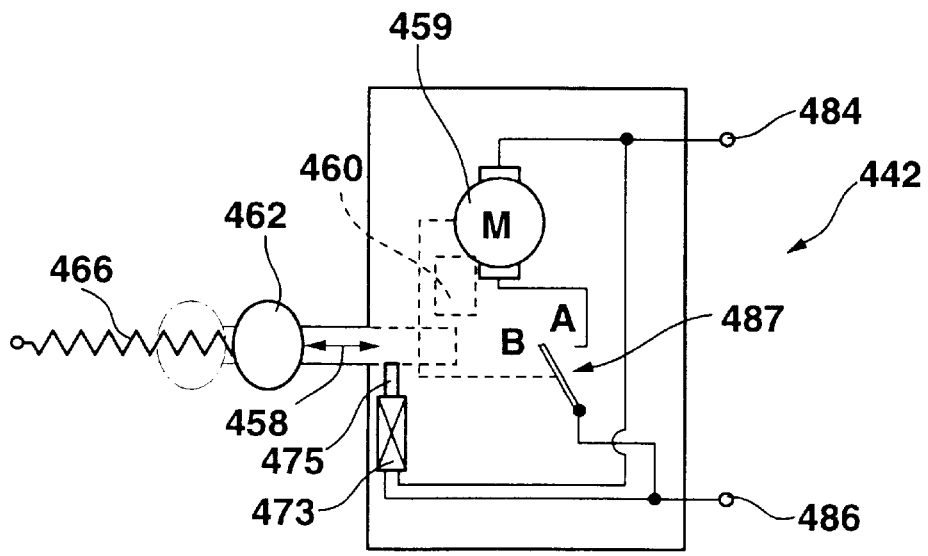
FIG. 7 is a simplified functional schematic view of the beam position adjusting device of an additional embodiment of the headlight of the present invention.

In the embodiments of the headlight shown in FIGS. 5–17, several variations of the beam position adjusting device are illustrated including, for example, the beam position adjusting device 342 shown in FIGS. 5 and 6 and the beam position adjusting device 442 shown in FIG. 7, and the direction of movement are indicated by the double arrows (designated with the "-58" suffix) of the respective drive arms (designated with the "-62" suffix). In these embodiments of the headlight, the movement of the drive arm to move the light source 12 from its disposition for the low beam position to its disposition for the high beam position is opposite to the movement of the drive arms of the embodiments of the headlight shown in FIGS. 1–4. Specifically, in the embodiments of the headlight shown in FIGS. 5–17, the drive arm is driven outward relative to the drive arm's coupling with the respective gear assembly to move the light source 12 from its disposition for the low beam position to its disposition for the high beam position whereas, in contrast, the drive arm of the embodiments of the headlight shown in FIGS. 1–4 is driven inward.

In the low beam position, the connection 386 of the beam position adjusting device 342 is in a non-current carrying condition and the drive arm 362 as well as the light source 12 and the switch 387 are disposed in their respective B positions for the low beam position, of which the B position of the drive arm 362 is shown in solid lines in FIG. 5. In the event of a changeover to the high beam position, the connection 386 is in a current carrying condition whereby the electric drive motor 359 is powered and the drive arm 362 is driven via the gear assembly 360 outwardly to the position shown by the broken lines in FIG. 5 to dispose the light source 12 in its disposition for the high beam position. The switch 387 is activated in conjunction with the movement of the gear assembly 360 or the drive arm 362 to switch into the A position. In the A position of the switch 387, the switch effects a shut down of the power to the electric drive motor 359 and effects the supply of power to the electromagnet 373. The gear assembly 360 is operatively blocked by the electromagnet 373 while, for example, the gear pair 391, which is at least partially comprised of soft iron material, is rendered nonrotatable. Alternatively, the electromagnet 373, which is shown in broken lines in FIG. 6, can render immovable, in its disposition for the high beam position, the drive arm 362, which is at least partially comprised of soft iron material, so that the return movement element 366 cannot effect a movement of the light source 12 into its disposition for low beam position. As another alternative, the electromagnet 373 can operatively block the gear assembly 360 or the electric drive motor 359 so that no movement of the drive arm 362 via the return movement element 366 can occur.

In the event of a changeover to the low beam position, the connection 386 is in a non-current carrying condition as well as the electromagnet 373, whereby the drive arm 362 or, respectively, the gear assembly 360 and the electric drive motor 359 are no longer operatively blocked and the return movement element 366 can effect movement of the light source 12 into its disposition for the low beam position. In this connection, the switch 387 is moved and again takes its B position for the low beam position. In the event of a break in a connection to the beam position adjusting device 342, the connection 386 reverts to a non-current carrying condition, whereby the return movement element 366 can move the light source 12 into its disposition for the low beam position. In the event of other interruptions, the connection 386 is switched to a non-current carrying condition and the light source 12 is moved into its disposition for the low beam position.

Figure 8:
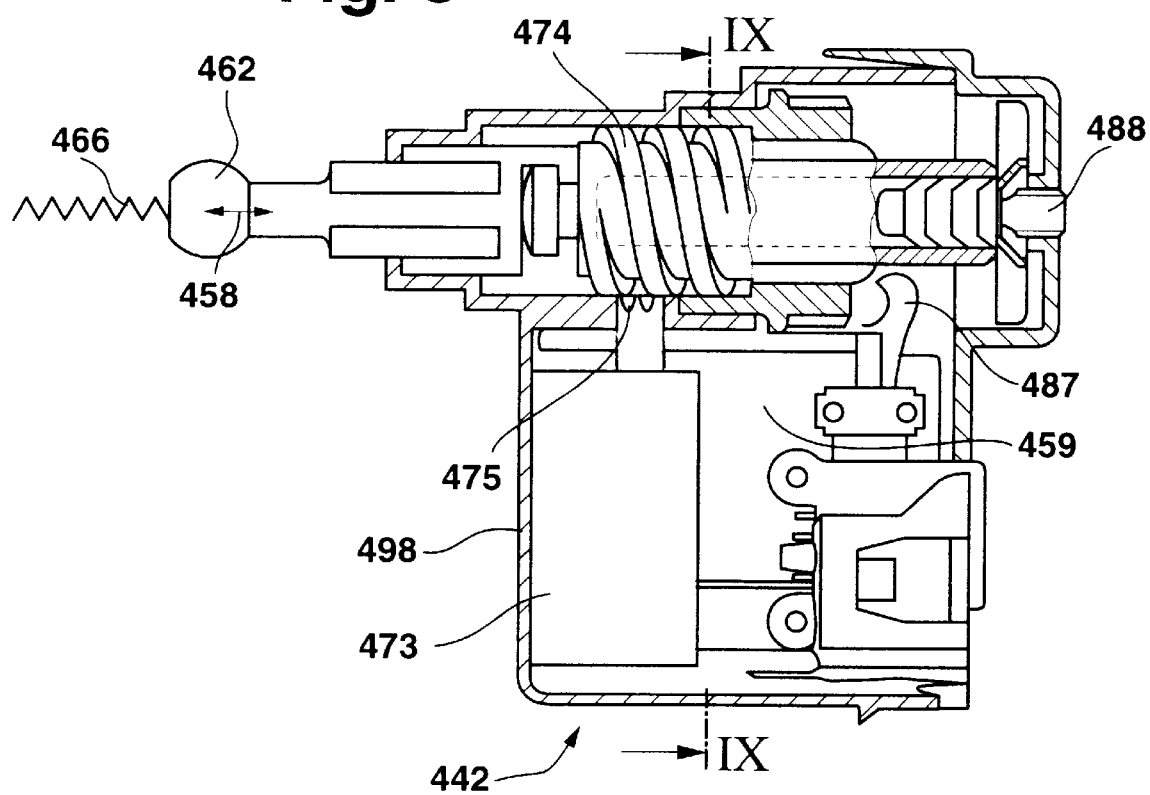
FIG. 8 is a vertical sectional view taken along lines VIII—VIII in FIG. 9 of the beam position adjusting device of the additional embodiment of the headlight shown in FIG. 7.
Figure 9:
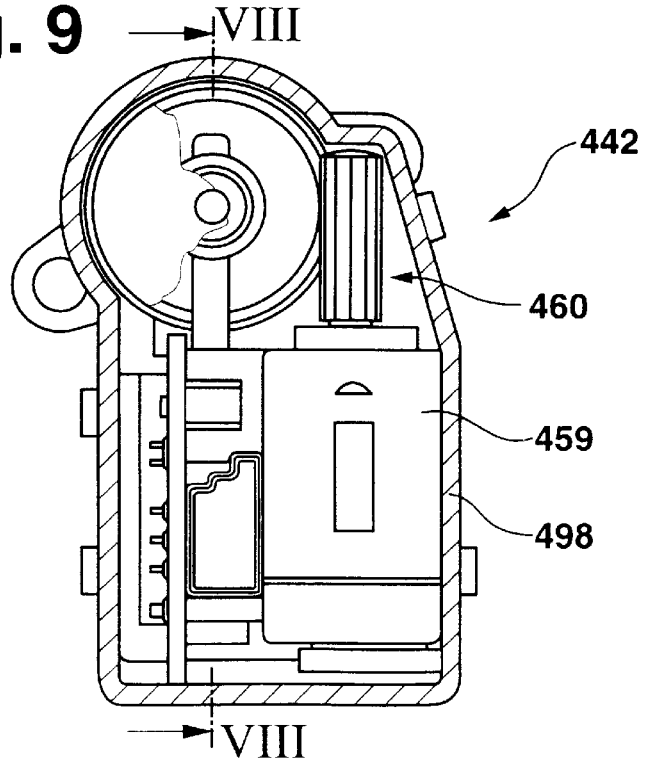
FIG. 9 is a vertical sectional view taken along lines IX—IX in FIG. 8 of the beam position adjusting device of the additional embodiment of the headlight shown in FIG. 7.
Figure 12:
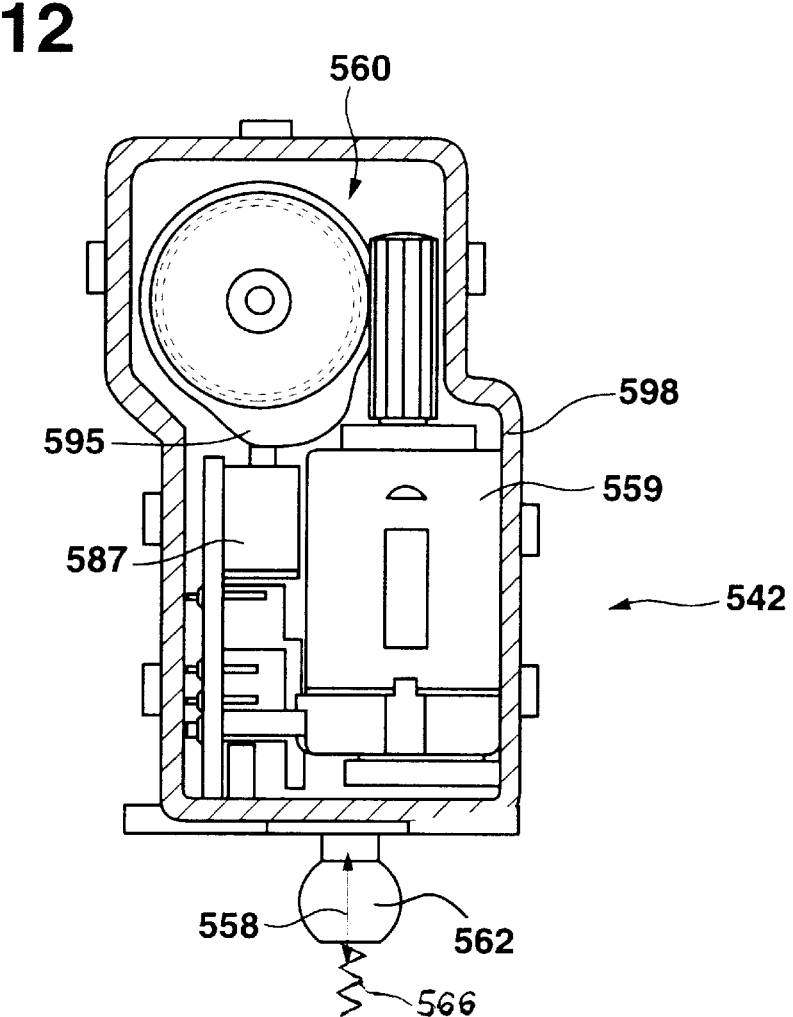

FIG. 7 shows a simplified functional schematic view of the beam position adjusting device 442 of an additional embodiment of the headlight of the present invention and FIGS. 8 and 9 show respective vertical sectional views of the beam position adjusting device 442. The beam position adjusting device 442 includes a direct current motor 459 which is drivingly connected to a gear assembly 460 for driving the gear assembly to extend or retract a drive arm 462. The beam position adjusting device 442 includes a ground connection 484 and a connection 486 which is in a current carrying condition in the high beam position. A switch 487 is movable between a B position for the low beam position and an A position for the high beam position, whereby movement of the switch is effected through the gear assembly 460 or the drive arm 462. The beam position adjusting device 442 also includes an electrically activatable device in the form of an electromagnet 473 which is configured as a stroke magnet or solenoid and which is operable, while in its powered condition, to extend a blocking arm 475 into blocking engagement with the drive arm 462 to thereby block movement thereof in a direction indicated by the double arrow 458 in FIG. 7. In its non-powered condition of the electromagnet 473, the drive arm 462 is not blocked by the blocking arm 475 and is therefore free to move as indicated by the double arrow 458. In the low beam position, the connection 486 as well as the light source 12 are disposed by the return movement element 466 in their respective dispositions for the low beam position and in these dispositions, the switch 487 is in its B position. During this time, the electromagnet 473 is in its non-powered condition, whereby the drive arm 462 is movable. In the event of a changeover to the high beam position, the connection 486 is in a current carrying condition, whereby the electric drive motor 459 is powered to thereby move the drive arm 462 and thereby the light source 12 into their respective dispositions for the high beam position. Upon completion of the movement of the light source 12 into its disposition for the high beam position, the electric drive motor 459 is switched off and the electromagnet 473 is powered, whereby the blocking arm 475 is moved into its blocking position in which it prevents the drive arm 462 from moving from its disposition for the high beam position.

In the event of a changeover to the low beam position, the connection 486 is switched into a non-current carrying condition and the blocking arm 475 automatically returns to its non-blocking position, whereby the drive arm 462 is no longer blocked. Consequently, the return movement element 466 is free to move the light source 12 into its disposition for the low beam position, whereby the switch 487 is moved into its B position.

As seen in FIGS. 8 and 9, the beam position adjusting device 442 includes a housing 498 and the gear assembly 460 includes a worm gear 474 which is drivingly rotated by the electric drive motor 459. The drive arm 462 is operatively coupled to the worm gear 474 such that the gear can rotate relative to the drive arm while the gear and the drive arm nonetheless are coupled for linear movement in the directions indicated by the double arrow 458. The blocking arm 475 includes a relief portion at its free end compatibly configured with the threaded surface of the worm gear 474 such that the blocking arm can transversely engage the worm gear. In the low beam position, the electric drive motor 459 is not powered and the electromagnet 473 does not need to be powered or can alternatively be disposed in a powered condition. In the event of a changeover into the high beam position, the electric drive motor 459 and the electromagnet 473 are powered, whereby the blocking arm 475 is driven into engagement with the worm gear 474 with the compatibly configured free end of the blocking arm permitting the worm gear 474 to continue its rotation. The rotational movement of the worm gear 474 is translated into linear movement of the drive arm 462 which thereby moves the light source 12 into its disposition for the high beam position. Upon completion of the movement of the light source 12 into this disposition, it is only necessary to continue to power the electromagnet 473 while the electric drive motor 459 is switched off.

In the event of a changeover into the low beam position, the electromagnet 473 is rendered into a non-powered condition, whereby the blocking arm 475 is moved out of engagement with the worm gear 474 and the return movement element 466 then moves the drive arm 462 and, correspondingly, the light source 12 into their respective dispositions for the low beam position. In the event that the connection 486 is broken off or interrupted, the light source 12 remains in its disposition for the low beam position and cannot be moved into its disposition for the high beam position. To the extent that the electric drive motor 459 or the gear assembly 460 are blocked, the electromagnet 473 can be switched to a non-powered condition, whereby the blocking arm 475 is not moved into engagement with the worm gear 474 and no movement of the drive arm 462 into its disposition for the high beam position can occur. The gear assembly 460 can be configured as either self limiting or non-self limiting. The base position of the worm gear 474 and the drive arm 462 relative the direction indicated by the double arrow 458 can be adjustable by means, for example, of an adjustment element 488 in the form of a bolt acting on the worm gear 474.

FIGS. 10 shows the beam position adjusting device 542 of a further additional embodiment of the headlight of the present invention. The beam position adjusting device 542 includes a housing 598 in which a direct current electric drive motor 559 is disposed and which is operatively connected via a worm gear 560 with a drive element 582 for driving movement thereof. The drive element 582 is coupled via a coupling 580 to a driven element 584.

The driven element 584 is in the form of a gear rotatable about an axis 596 and a projection 585 is eccentrically mounted on the driven element 584 and extends perpendicular to the direction of movement of the drive arm 562 as indicated by the double arrow 558. The coupling 580 includes a transfer element 586 having a an annular flange portion about whose circumference are arranged a plurality of wedge shaped profiles 597. The backside of the driven element 584 includes a plurality of wedge shaped grooves compatibly configured with the wedge shaped profiles 597 for engagement thereby while permitting the driven element 584 to be disengaged from the coupling 580 by a prescribed relative movement therebetween in a direction parallel to the axis 596. A pretensioned spring 589 is operable to constrain the transfer element 586 of the coupling 580 to remain in engagement with the driven element 584, whereby one end of the spring 589 is supported against the drive element 582 and the other end of the spring is supported against a flange 590 of the transfer element 586.

The flange 590 can be secured to the transfer element 586 via a screw 591 and is comprised at least in part of soft iron. An electromagnet 573 is disposed adjacent the flange 590 which in the low beam position is in a non-powered condition and in the high beam position is in a powered condition.

The projection 585 of the driven element 584 is operable to engage the rear end 592 of the drive arm 562, whereby the drive arm is linearly driven. In the low beam position, the electric drive motor 559 and the electromagnet 573 are not powered so that the drive arm 562 and the light source 12 are in their respective dispositions for the low beam position. A switch 587 of the beam position adjusting device 542 is in a position for the low beam position. In the event of a changeover to the high beam position, the electric drive motor 559 and the electromagnet 573 are powered. The drive element 582 is driven in the rotational direction c by the electric drive motor 559 via the gear assembly 560. The spring 589 exerts a biasing force on the transfer element 586 and, together with the electromagnet 573 exerts a force on the flange 590, whereby the wedge shaped profiles 597 of the transfer element 586 engage the wedge shaped grooves of the driven element 584 to thereby drivingly rotate the driven element 584. The rotation of the driven element 584 cyclically brings the projection 585 into engagement with the drive arm 562 to thereby impart a stroke type movement to the drive arm. The drive arm extends against the bias of the return movement element 566 to dispose the light source 12 in its disposition for the high beam position. An eccentrically mounted plate 595 on the driven element 584 moves the switch 587 into its position for the high beam position. It can provide, in the high beam position, that the electric drive motor 559 and the electromagnet 573 continue to be powered, whereby the drive arm 562 and, thus, the light source 12 are maintained in their respective dispositions for the high beam position, whereby it is not necessary to configure the gear assembly 560 as self limiting. Alternatively, it can be provided that, in the high beam position, only the electromagnet 573 remains powered while the electric drive motor 599 is not powered. In this event, the gear assembly 560 is configured to be self limiting so that the biasing force of the return movement element 566 cannot exert a turning moment on the gear assembly 560 and the electric drive motor 559.

In the event of a changeover to the low beam position, the electromagnet 573 is switched into a non-powered condition, whereby only the spring force of the spring 589 is exerted on the transfer element 586 of the coupling 580 and only a relatively minor turning moment is transferred by the coupling. In this event, the strength of the turning moment generated by the return movement element 566 is greater than that of the coupling 580, whereby the driven element 584 turns through the resistance offered by the drive element 582 and, correspondingly, the drive arm 562 and, thus, the light source 12 are moved into their respective dispositions for the low beam position. In this event, the eccentric plate 595 moves the switch 587 again into its position for the low beam position. In the event of a connection break to the beam position adjusting device 542, the electromagnet 573 is switched to a non-powered condition, whereby the drive arm 562 and, thus, the light source 12 are disposed by the return movement element 566 in their respective dispositions for the low beam position.

In the event of a blocking of the electric drive motor 559 or the gear assembly 560, the drive arm 562 and, thus, the light source 12, can be moved by the return movement element 566 as the electromagnet 573 is in a non powered condition.

FIG. 13 shows a simplified functional schematic view of the beam position adjusting device 642 of a second further additional embodiment of the headlight of the present invention. The beam position adjusting device 642 includes a housing 698 in which is disposed the electric drive motor 659 which is operable to drive, via a gear assembly 660, a drive arm 662 against the bias of a return movement element 666 in a direction indicated by the double arrow 658. The beam position adjusting device 642 includes a connection 684 which is in a current carrying condition in the low beam position and a connection 686 which is in a current carrying condition in the high beam position. A switch 687 of the beam position adjusting device 642 is in a B position in the low beam position and in an A position in the high beam position. The electric starter of the gas discharge lamp of the light source 12 can serve as the control unit 682 of the beam position adjusting device 642 and, in this configuration, the electric starter is enhanced with the necessary switch components and is connected with the light switch of the vehicle or a separate control device. In the low beam position, the connection 686 is in a non-current carrying condition. In the event of a changeover to the high beam position, the connection 686 is supplied with current and the electric drive motor 659 drives the drive arm 662 via the gear assembly 660 to thereby move the light source 12 against the bias of the return movement element 666 into its disposition for the high beam position, whereby the switch 687 is moved into its A position.

As seen in FIGS. 14–16, the gear assembly 660 can be configured as a worm gear assembly having a worm gear 690. On the backside of the worm gear 690 are disposed at uniform annular spacings from one another three projection 691 which is eccentric to an axis 692 and transverse to the direction of movement of the drive arm 662 indicated by the double arrow 658. The worm gear 690 includes an eccentric plate having at least one cam 693, whereby in correspondence with the provision of three projections 691, there are provided three cams uniformly annularly spaced from one another around the eccentric plate. The drive arm 662 is displaceable in the directions indicated by the double arrow 658 and includes on its back end 694 a tapered surface tapering in the rotation direction c of the worm gear 690. In the event of a changeover to the high beam position from the low beam position, the electric drive motor 659 rotates the worm gear 690, whereby one of the projections 691 engages the back end 694 of the drive arm 662 and imparts a stroke movement thereto such that the drive arm and, thus, the light source 12 are moved into their respective dispositions for the high beam position. One of the projections 691 moves the switch 687 into its A position for the high beam position, in which position the electric drive motor 659 is not powered. The gear assembly 660 is configured to be self limiting, whereby the gear assembly cannot be rotated by the rotational force exerted by the return movement element 666 and, thus, the electric drive motor 659 cannot be rotated. In the event of a changeover to the low beam position, the electric drive motor 659 is again powered, whereby the respective projection 691 which is in engagement with the back end of the drive arm 662 is rotated out of engagement. In this disposition of the out of engagement projection, the return movement element 666 is able to move the drive arm 662 and, thus, the light source 12 into their respective dispositions for the low beam position. The cams 693 of the eccentric plate move the switch 687 again into its B position for the low beam position and the power to the electric drive motor 659 is shut off. The electric drive motor 659 can be driven in the same rotation direction c for all changeovers between the low beam position and the high beam position since in each instance one of the projections 691 again engages the back end of the drive arm 662.

FIG. 17 shows a simplified functional schematic view of the beam position adjusting device 742 of a third further additional embodiment of the headlight of the present invention. The functional configuration of the beam position adjusting device 742 is similar to that of the other beam position adjusting device described hereinabove with respect to the second further embodiment of the headlight of the present invention. A electric drive motor 759 drives, via a gear assembly 760, a drive arm 762 which is coupled to the light source 12. The beam position adjusting device 742 includes a connection 786 which is supplied with current in the high beam position and a connection 784 which is, for example, continuously supplied with current during the time when the headlight is illuminated. The starter device of the gas discharge lamp version of the light source 12 can be configured as the control unit 782 of the beam position adjusting device or the control unit can be a separate unit. The beam position adjusting device 742 includes a switch 787 which is movable between a B position in the low beam position and an A position in the high beam position. The beam position adjusting device 742 includes a relay 790 which is switchable between the connections 786 and 784 as well as the switch 787. In the low beam position, the connection 786 is not supplied with current while the connection 784 is supplied with current. In the event of a changeover from the low beam position to the high beam position, the connection 786 is supplied with current. In this event, the electric drive motor 759 drives the drive arm 762 via the gear assembly 760 to move against the bias of the return movement element 766 in a direction indicated by the double arrow 758 into the disposition in which the light source 12 is disposed in its disposition for the high beam position. The relay 790, which can be, for example, a magnet relay, is supplied with current and in this manner the connection of the connection 784 with the electric drive motor 759 is broken off and thereby rendered without power.

If the drive arm 762 along with the light source 12 have reached their respective dispositions in the high beam position, the switch 787 is moved into its A position for the high beam position and the electric drive motor 759 is switched off from power. The drive arm 762 and, thus, the light source 12 are maintained in their dispositions for the high beam position and the gear assembly 760 is self limiting such that the force of the return movement element 766 cannot exert itself through the gear assembly 760 to turn the electric drive motor 759. In the event of a changeover to the low beam position, the connection 784 is switched to a non-current carrying condition such that the relay 790 is not powered any longer and the connection 786 is again supplied with current and its connection with the electric drive motor 759 is reconnected. Accordingly, the electric drive motor 759 is powered again and it drives the worm gear 790 of the gear assembly 760. If the projection 691 is moved out of engagement with the drive arm 762, the drive arm 762 and, thus, the light source 12, are moved into their respective dispositions in the low beam position. In this manner, the switch 787 is again moved into its B position for the low beam position.

In the configurations of the beam position adjusting device 642 of the second further additional embodiment of the headlight and the beam position adjusting device 742 of the third further additional embodiment of the headlight, in the event of an interruption of the connection to the beam position adjusting device or in the event of another operational disturbance, a security function has been provided in that the light source 12 is put into a non-illuminated condition. It can also be provided that the light source 12 is only put in a non-illuminated condition in the low beam position while, in the high beam position, the light source 12 can remain illuminated. Alternatively, the light source 12 can be put in a non-illuminated condition in both the low beam position and the high beam position.

With respect to the above described embodiments of the headlight of the present invention, it can be provided that the control units 182–782 are operable to monitor the position of the switches 187–787. In this manner, it can be determined if a particular switch is in its A position for the high beam position or in its B position for the low beam position. If such is not the case, the security function of the beam position adjusting device 142–542 is effectuated in that the electrically activatable apparatus 159–573 are switched to a non-powered condition, whereby the drive arm 162–562 and the thereto coupled light source 12 are moved by the return movement element 166–566 into their respective dispositions for the low beam position. In the second and third further additional embodiments of the headlight, the security function is effectuated by the shut off of power to the light source 12.

As an alternative to the above described security functions, an additional position determining device 800 as seen in FIG. 1 can be provided through which the actual position of the light source 12, the lamp support 22 or the drive arm 162–762 can be determined and compared with a desired position value for the low beam position or the high beam position. In the event of a divergence of an actual position determination and a desired position value, the electrically activatable apparatuses can be rendered without power or the operation of the light source 12 can be prevented.

We claim:

1. A headlight for a vehicle, the headlight having the capability of projecting a low beam and a high beam, comprising:
    a light source for emitting light;
    a reflector for reflecting light emitted by the light source;
    a beam position adjusting device for selectively adjusting the position of the light source relative to the reflector between a low beam position in which the headlight projects a low beam and a high beam position in which the headlight projects a high beam,
    the beam position adjusting device having:
        an electric powered drive motor,
        a displaceable interconnecting element interconnecting the beam position adjusting device and the light source, the displaceable interconnecting element being movable between a low beam disposition in which it disposes the light source in its respective disposition relative to the reflector at which a low beam is projected thereby and a high beam disposition in which it disposes the light source in its respective disposition relative to the reflector at which a high beam is projected, and
        a motion translation element for translating the drive output of the drive motor to displacement of the displaceable interconnecting element, the beam position adjusting device being operable to dispose the light source in its high beam position; and
        a return movement device for moving the light source from its high beam disposition to its low beam disposition.

2. The headlight according to claim 1 wherein the beam position adjusting device is an electrically activatable device having a powered condition in which it disposes the light source in its high beam disposition and a non-powered condition in which it does not prevent movement by the return movement element of the light source from its high beam disposition to its low beam disposition.

3. The headlight according to claim 2 wherein the drive motor is electrically activatable and is disposable in a blocked powered condition to prevent movement of the light source from its high beam disposition.

4. The headlight according to claim 3 wherein the drive motor is powered in an intermittent manner in its blocked powered condition.

5. The headlight according to claim 2 wherein the motion translation element includes an electrically activatable electromagnetic coupling operable to displace the displaceable interconnecting element in response to the supply of power to thereby move the light source from its low beam disposition to its high beam disposition.

6. The headlight according to claim 5 wherein the motion translation element includes a gear assembly and the electromagnetic coupling operatively interconnects the gear assembly and the displaceable interconnecting element.

7. The headlight according to claim 2 wherein the motion translation element includes an electrically activatable electromagnetic coupling operable in a powered condition to dispose the light source in its high beam disposition.

8. The headlight according to claim 7 wherein the electromagnetic coupling is connected to the displaceable interconnecting element and is operable to displace the displaceable interconnecting element to its high beam disposition and to maintain it in the high beam disposition during the powered condition of the electromagnetic coupling.

9. The headlight according to claim 7 wherein the electromagnetic coupling is operable to block the motion translation element from translating the drive output of the drive motor to the displaceable interconnecting element.

10. The headlight according to claim 7 wherein the electromagnetic coupling is a solenoid operable in a powered condition to dispose the light source in its high beam disposition.

11. The headlight according to claim 10 wherein the motion translation element includes a worm gear connected to the displaceable interconnecting element such that rotational movement of the worm gear by the drive motor is translated into displacing movement of the displaceable interconnecting element and the solenoid includes a blocking member operable to engage the worm gear to prevent a return movement of the worm gear whereby the light source is maintained in its high beam disposition.

12. The headlight according to claim 2 wherein the beam position adjusting device includes a slide coupling and an electrically activatable electromagnet, the return movement device is operable, in a non-powered condition of the electromagnet, to exert, via the displaceable interconnecting element, a sufficient turning moment on the slide coupling to move the light source from its high beam disposition to its low beam disposition and the electromagnet being operable, in a powered condition, to exert a turning moment via the slide coupling to overcome the turning moment exerted by the return movement device to a degree sufficient to displace the displaceable interconnecting element and the light source to their respective high beam dispositions.

13. The headlight according to claim 12 wherein the return movement device is operable to impart a biasing force on the light source to bias the light source to move from its high beam disposition to its low beam disposition and the beam position adjusting device includes a take off element drivingly connectable to the drive motor via the slide coupling to be rotatable driven by the drive motor, the take off element having a stroke motion component eccentrically mounted thereto relative to the rotational axis of the take off element and operable to displace the displaceable interconnecting element against the bias of the return movement device into its high beam disposition in response to rotation of the take off element.

14. The headlight according to claim 2 wherein the beam position adjusting device includes a switch for switching the electrically activatable element to a non-powered condition in connection with movement of the light source from its high beam disposition to its low beam disposition and the return movement device is operable to automatically move the light source from its high beam disposition to its low beam disposition when the electrically activatable element is disposed in its non-powered condition.

15. The headlight according to claim 2 wherein the return movement device is operable to assist the drive motor in movement of the light source from its high beam disposition to its low beam disposition.

16. The headlight according to claim 2 wherein the beam position adjusting device includes a switch switchable between a position for low beam disposition and a position for high beam disposition, the switch being operable to switch between its two positions in connection with movement of the light source between its high and low beam dispositions and being operable to control the supply of power to at least one of the drive motor and the electrically activatable element.

17. The headlight according to claim 2 wherein the beam position adjusting device includes an element for determining an actual orientation of the light source at a selected instant and the beam position adjusting device is operable to dispose the electrically activatable element in a non-powered condition in response to a determination that an actual orientation of the light source is different than a predetermined desired orientation of the light source.

18. The headlight according to claim 1 wherein the return movement device is operable to impart a biasing force on the light source to bias the light source to move from its high beam disposition to its low beam disposition and the beam position adjusting device includes a take off element drivingly connectable to the drive motor via the slide coupling to be rotatable driven by the drive motor, the take off element having a stroke motion component eccentrically mounted thereto relative to the rotational axis of the take off element and operable to displace the displaceable interconnecting element against the bias of the return movement device into its high beam disposition in response to rotation of the take off element and the stroke motion component being movable to permit movement of the displaceable interconnecting element by the return movement device so as to move the light source into its low beam disposition.

19. A headlight according to claim 18 wherein the beam position adjusting device includes a switch switchable between a position for low beam disposition and a position for high beam disposition, the switch being operable to switch between its two positions in connection with movement of the light source between its high and low beam dispositions and being operable to control the supply of power to the drive motor.

20. A headlight according to claim 18 wherein the beam position adjusting device includes an element for determining an actual orientation of the light source at a selected instant and the beam position adjusting device is operable to dispose the electrically activatable element in a non-powered condition in response to a determination that an actual orientation of the light source is different than a predetermined desired orientation of the light source.

* * * * *